United States Patent [19]
Kressly et al.

[11] Patent Number: 4,907,933
[45] Date of Patent: Mar. 13, 1990

[54] PALLET UNLOADER

[75] Inventors: Richard H. Kressly, Red Hill; Greogry B. Dale, Warrington; William J. Plant, Hatfield, all of Pa.

[73] Assignee: FMC Corporation, Chicago, Ill.

[21] Appl. No.: 388,721

[22] Filed: Jul. 31, 1989

Related U.S. Application Data

[63] Continuation of Ser. No. 232,076, Aug. 15, 1988, abandoned.

[51] Int. Cl.$^4$ .............................................. B65G 67/24
[52] U.S. Cl. ...................................... 414/334; 414/395
[58] Field of Search ............... 414/389, 390, 395, 396, 414/334, 337, 344, 391, 392; 198/468.11, 597

[56] References Cited

U.S. PATENT DOCUMENTS

| 1,618,917 | 2/1927 | Crawford | 414/395 |
|---|---|---|---|
| 3,169,652 | 2/1965 | Ewell | 414/396 X |
| 3,403,794 | 10/1968 | Lopez | 198/597 X |
| 3,502,301 | 3/1970 | Davis et al. | 414/389 X |
| 3,638,809 | 2/1972 | Grundon | 414/395 |
| 3,797,682 | 3/1974 | De Beer | 414/389 X |
| 4,039,090 | 8/1977 | Desourdy | 414/389 X |
| 4,139,108 | 2/1979 | Kamp et al. | 198/597 X |
| 4,227,848 | 10/1980 | Kriechbaum et al. | 414/395 |
| 4,270,880 | 6/1981 | Allard | 414/389 X |
| 4,728,241 | 3/1988 | Edelhoff et al. | 414/395 X |

FOREIGN PATENT DOCUMENTS

| 2711132 | 9/1978 | Fed. Rep. of Germany | 198/468.11 |
|---|---|---|---|
| 1252266 | 8/1986 | U.S.S.R. | 414/390 |

Primary Examiner—David A. Bucci
Attorney, Agent, or Firm—Douglas W. Rudy; Richard B. Megley

[57] ABSTRACT

Vehicles supporting a load are propelled between a load receiving station and a pallet unloading station. When the loaded vehicle is in a predetermined location, the pallet unloader is actuated causing the unloader ram element of the pallet unloader to contact the load and urge the load off the support vehicle and onto the load receiving station. This unloading is accomplished while the vehicle continues to move through the unloading station. The rate of unloading is coordinated with the speed of the vehicle through the unloading station.

5 Claims, 2 Drawing Sheets

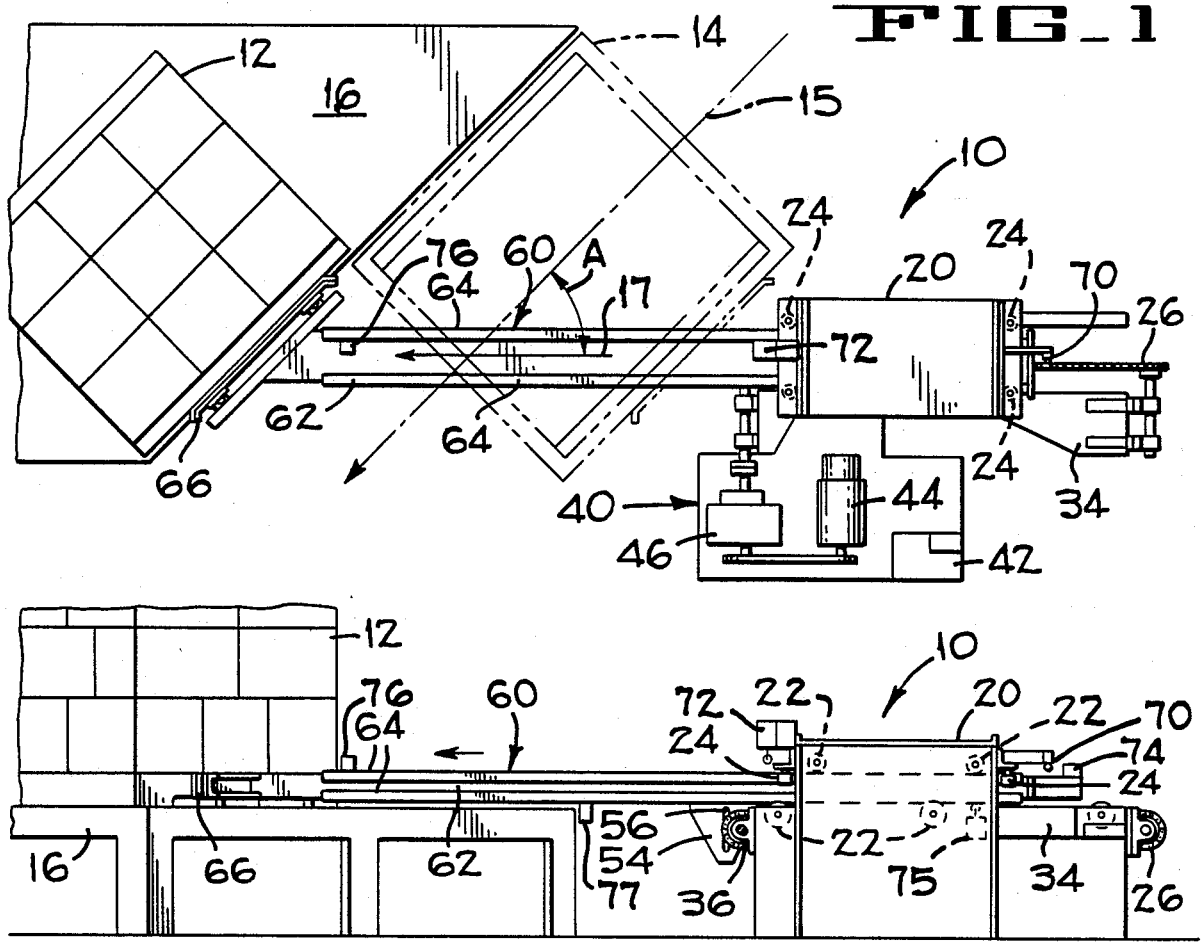
FIG_1
FIG_2
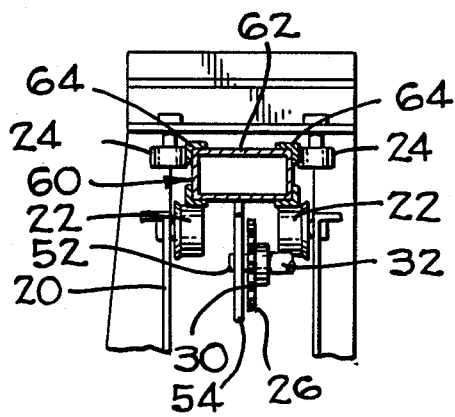
FIG_3

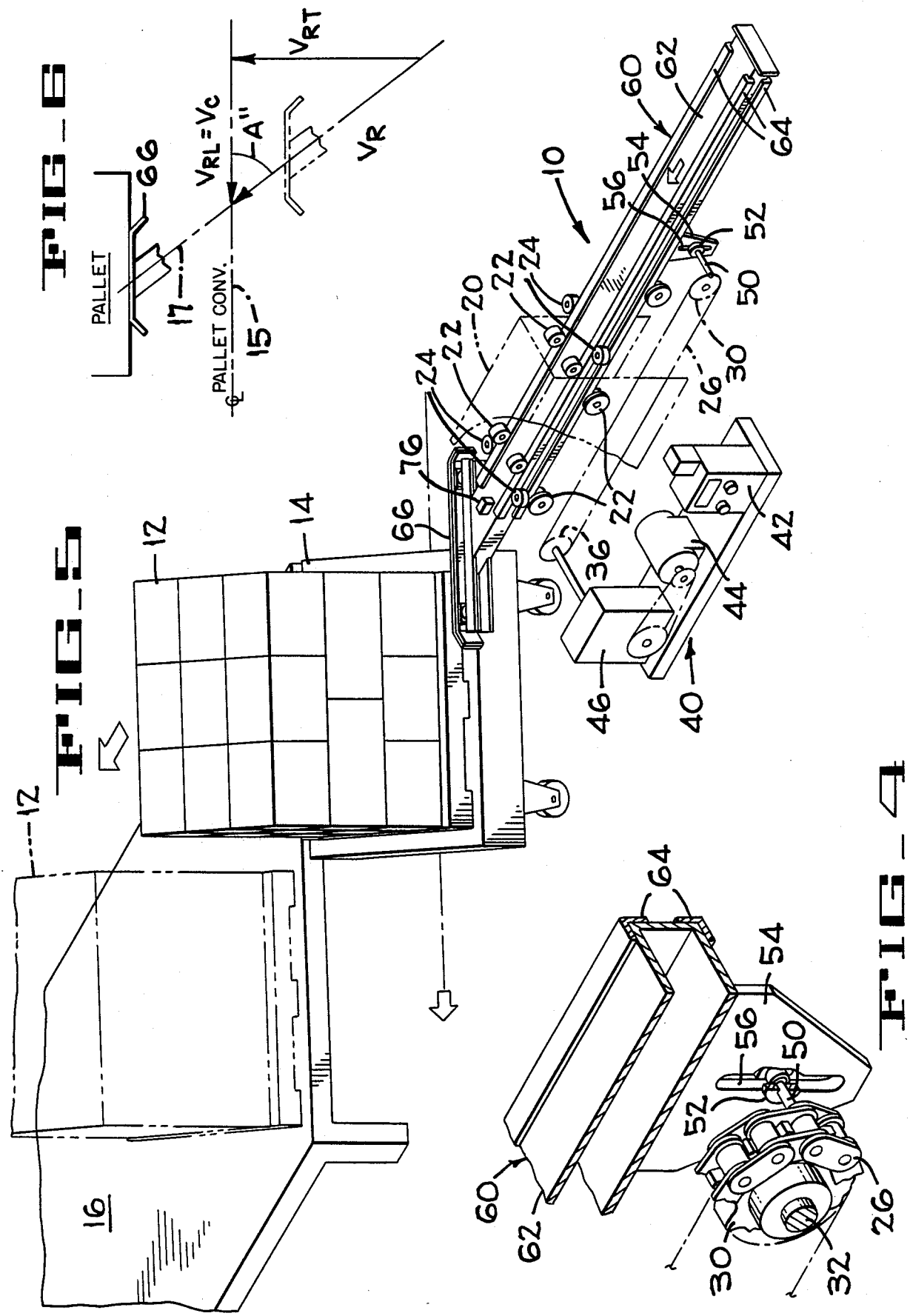

PALLET UNLOADER

This application is a continuation of application Ser. No. 07/232,076, filed 8/15/88, now abandoned.

A pallet unloading apparatus is provided to facilitate the unloading of a palletized load from a moving load supporting vehicle as the loaded vehicle passes between the load receiving station and the pallet unloading apparatus location. The load receiving station may be a roller bed with either driven or non-driven rollers, casters or air-bed/air bearing surfaces. The load receiving station will have a bed surface height that would be at the same height as the bed surface of the load supporting vehicle.

The load supporting vehicle is based on a conventional cart used in material handling systems. The vehicle may have support wheels supporting the vehicle on a floor surface. The vehicle will or could be propelled to the unloading station by means of any of several conventional propulsion alternatives, for instance, a two chain above or below the support floor, an overhead tow chain or a buried cable control system with the vehicle being self propelled or any other well known means. It is not necessary that the load carrying vehicle be of a certain type of material handling device as long as it is a vehicle that can be loaded with a palletized load to be unloaded.

The load supporting vehicle will be equipped with a roller deck, caster deck or other surface that allows a palletized load to be rolled or pushed off the roller deck of the load supporting vehicle. In a preferred embodiment, this would be an undriven roller bed having the rollers aligned with the normal direction of travel of the vehicle so that the palletized load can be pushed off the roller bed laterally as the load supporting vehicle continues to be propelled through the unloading station. It would not be necessary that such rollers be at ninety degrees to the major axis of the load supporting bed. An alternative embodiment of the invention contemplates the use of a conveyor system to deliver a loaded (or an unloaded) pallet to the pallet transfer location or unloading area.

A significant feature of the pallet unloading apparatus is that the fixed angular alignment of ram travel and load supporting vehicle travel, when coordinated with their respective speed vectors, results in no relative motion between the pallet and the ram of the pallet unloading apparatus.

The pallet unloading apparatus itself comprises an unloader ram that contacts the loaded or unloaded pallet and pushes it off the roller bed as the load supporting vehicle moves through the unloading area. The invention will be more definitively explained in the following text which, when perused in conjunction with the attached drawing figures, will enable a complete understanding of the invention.

In the Drawing Figures:

FIG. 1 is a plan view of the general arrangement of the invention;

FIG. 2 is a side elevation view of the load transfer station;

FIG. 3 is an elevation view of the unloader ram support in partial cross section and having a portion broken away to reveal the unloader ram;

FIG. 4 is an enlarged broken away section of the drive pin coupling of the unloading apparatus;

FIG. 5 is a perspective view of a pallet unloading work station;

FIG. 6 is a diagram of vector and angular relationships of the invention.

In FIG. 1, and in the other drawing figures wherein like reference characters refer to like elements, the pallet unloading apparatus, generally 10, is shown in a fully extended position wherein a palletized load 12 has been moved from a load supporting vehicle 14 to a receiving platform 16. The pallet unloading apparatus, generally 10, comprises a housing 20 which is a vertically upstanding enclosure supporting support wheels such as 22 and numerous sets of guide wheels such as 24.

The housing 20 also contains a drive mechanism, including a chain 26 supported at a non-driven end by a sprocket 30 supported on a shaft 32 which is fixed to the housing 20 by a support 34.

The driven end of the chain 26 is supported and driven through a driven sprocket 36 which is powered through a drive mechanism generally 40 which, in a preferred embodiment, includes a control box 42, an electric motor drive 44 and a gear box 46. The chain 26 is provided with an extended link pin 50 which has an outward end equipped with a roller surface or bearing surface element 52. The extended link pin and attendant element interface with a drive dog 54 via a lost motion slot 56.

The unloader ram, generrly 60, is an elongated structural member 62 of, in the preferred embodiment shown, rectangular tubular configuration as shown in the cross sectioned view in FIG. 3. The unloader ram may be equipped with guide surface wear plates such as 64.

The drive dog 54 is attached to the underside of the unloader ram member 62 at one relative end of the unloader ram member. At the other end of the unloader ram member a load contacting shoe 66 may be mounted at a fixed angle as shown, or mounted such that the load contacting shoe angle relative to the unloader ram member is adjustable.

A limit switch 70 is mounted to the housing 20 (right side of FIG. 2) and is triggerable by tab in the case of a proximity type switch or a cam in the case of a cam actuated switch which is normally mounted to the top surface of the unloader ram member 62. Actuation of this limit switch indicates that the ram is fully extended and the load supporting vehicle has been unloaded.

FIGS. 1 and 6 also show included angle "A" as being that angle between the normal flow or path of the load supporting vehicle to the unloading station, the normal path being represented by the interrupted line 15, and the unloader ram's normal direction of travel represented by interrupted line 17. As stated above, one significant feature of this invention is that the fixed angular alignment of the unloader ram and the normal path of the load supporting vehicle through the pallet unloading station, represented by angle "A", when coordinated with the load supporting vehicle speed vector and unloader ram speed vector results in no readily perceptible relative motion between the pallet being unloaded and the load contacting shoe 66.

As shown in FIG. 6, the desired relationship mentioned above is accomplished when the load supporting vehicle speed "$V_C$" is equal to unloader ram velocity in the direction of vehicle travel "$V_{RL}$". Unloader ram velocity "$V_R$" can be calculated by "$V_R$" = "VRL". Ram velocity transverse to vehicle travel is represented by "$V_{RT}$" and can be calculated by "$V_{RT}$"

=("V$_{RL}$")(tanA). V$_R$ is adjusted or permanently set into the equipment to equal V$_C$ to insure that there is no relative motion between pallet and shoe.

Such lack of relative motion between the pallet being unloaded and the load contacting shoe 66 tolerates out of specification pallets and loads overhanging the edge of the pallet significantly better than conventional designs using transverse ram motion only, even where the ram's load contacting position is equipped with rollers.

In operation, the pallet unloading apparatus will operate as follows: Starting from the development shown in FIG. 5, when a load supporting vehicle 14 is sensed by a sensing device or actuation means 11, such as a proximity switch indicating that a loaded load supporting vehicle is approaching the unloading station, the pallet unloading apparatus will be actuated. The load supporting vehicle will not be stoppd at the unloading station but will continue to travel through the unloading station as the unloader ram unloads the palletized load from the load supporting vehicle 14 by pushing the loaded pallet from the load supporting vehicle to the receiving platform 16.

As the load supporting vehicle 14 moves into position, the unloader ram will be driven by the drive chain and drive dog 54 outwardly toward and laterally across the load supporting vehicle pushing the loaded pallet off the load support vehicle as the unloader ram completes its cycle.

The drive dog 54 will be pushed by the extended link pin 50 attached to the drive chain 26 and will travel through a full, non-stop cycle in a single direction of chain drive.

As mentioned above, as the load supporting vehicle approaches the pallet unloading apparatus, the vehicle will activate actuation means 11 indicating to the control box 42 that a loaded vehicle is approaching. Another limit switch such as 13 senses the presence of the load supported vehicle in the work station. An adjustable time delay, which is set in a timer in the control box 42, is used to allow fine adjustment of the timing of the cycling of the unloader.

There are three limit switches mounted on the pallet unloading apparatus, generally 10. They are identified as 70, 72 and 75 activated by cams 74, 76 and 77 respectively. These limit switches are of a conventional type and can be of several designs such as roller arm actuated limit switches actuated as the roller ramps up a cam or proximity switches actuated when a tab moves into proximity of a sensing element.

The motion of the unloader ram is checked by reading limit switches 70 and 72 at each end of the ram travel cycle and comparing the switch readings with preset timer information to insure that the unloader cycle is completed in time to avoid a collision with other moving load supporting vehicles.

When a new cycle is initiated, a timer is activated which checks the time for a fully extended unloader ram with contact of limit switch 70 by cam 74 which designates completion of a load push off. A second limit switch, 72 is contacted by cam 76 when the unloader ram has returned and clears the conveyor line or the path of the load supporting vehicle. This limit switch also must be made in a given time frame. A third limit switch 75 is activated upon contact with cam 77 at the home position and sets the brake and stops the ram at the completion of the unloading cycle. The brake can be a conventional, well-known brake either in the gear box 44 or integral with the motor 42. Many types of brakes are available in the market for this function.

One of the key elements of this invention is that the unloader ram is timed to push a loaded pallet off a load supporting vehicle to a stationary platform without slowing or stopping the load supporting vehicle. Timing is critical and the direction and speed of the push off are set periodically so that the push off is completed in a timely manner—not too soon or too quickly and certainly in time before the load supporting vehicle clears the receiving platform.

Other nuances of the invention are contemplated by the inventors such as the substitution of proximity switches for the limit switches and alternative drive means such as a stepper motor for the chain drive. Such nuances of design are considered to be within the scope of the following claims wherein.

What is claimed is:

1. Apparatus for transferring a palletized load from a moving load supporting vehicle as said load supporting vehicle moves through an unloading station, said palletized load moving with said load supporting vehicle comprising:
    a load receiving station for receiving said palletized load from said moving load supported vehicle;
    an unloader ram having a leading edge for contacting said palletized load, said unloader ram mounted for extension along a predetermined path;
    drive means for driving said unloader ram along said predetermined path;
    actuator means responsive to the position of said load supporting vehicle relative to said unloading station for actuation of said drive means urging said unloader ram to discharge said palletized load from said moving load supporting vehicle while said palletized load continues to move with said moving load supporting vehicle to said load receiving station without relative motion between said palletized load and said leading edge of said unloader ram.

2. The invention in accordance with claim 1 wherein said unloader ram comprises:
    a ram supported on guide rollers and maintained in position by said guide rollers, on said predetermined path biased by said drive means.

3. The invention in accordance with claim 1 wherein said drive means for driving said unloader ram comprises:
    a motor drive chain fixed to said unloader ram and a motor to drive said motor driven chain.

4. The invention in accordance with claim 3 wherein said drive means further includes a variable speed gearbox mounted between said motor and said motor driven chain.

5. The invention in accordance with claim 3 wherein said drive means includes an unloader ram drive attached to said motor driven chain and said unloader ram drive restrained for movement relative to said unloader ram in a drive slot integral with said unloader ram.

* * * * *